(12) United States Patent
Furukawa et al.

(10) Patent No.: US 10,611,400 B2
(45) Date of Patent: Apr. 7, 2020

(54) ELECTRIC POWER STEERING DEVICE AND METHOD FOR CONTROLLING SAME

(71) Applicant: Mitsubishi Electric Corporation, Tokyo (JP)

(72) Inventors: Akira Furukawa, Tokyo (JP); Yu Kawano, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 155 days.

(21) Appl. No.: 15/754,327

(22) PCT Filed: Nov. 2, 2015

(86) PCT No.: PCT/JP2015/080892
§ 371 (c)(1),
(2) Date: Feb. 22, 2018

(87) PCT Pub. No.: WO2017/077567
PCT Pub. Date: May 11, 2017

(65) Prior Publication Data
US 2018/0244308 A1 Aug. 30, 2018

(51) Int. Cl.
*B62D 5/04* (2006.01)
*H02P 27/06* (2006.01)
(Continued)

(52) U.S. Cl.
CPC .......... *B62D 5/0484* (2013.01); *B62D 5/046* (2013.01); *B62D 5/0463* (2013.01); *B62D 5/0487* (2013.01); *H02P 21/0089* (2013.01); *H02P 21/05* (2013.01); *H02P 21/22* (2016.02); *H02P 25/22* (2013.01); *H02P 27/06* (2013.01); *H02P 29/0241* (2016.02); *H02P 29/50* (2016.02)

(58) Field of Classification Search
CPC .......... H02P 21/22; H02P 27/06; H02P 25/22; B62D 5/0487; B62D 5/0484
USPC ............................................ 701/43; 180/6.44
See application file for complete search history.

(56) References Cited

U.S. PATENT DOCUMENTS

2007/0107973 A1* 5/2007 Jiang ...................... B62D 5/046
180/443
2011/0074333 A1* 3/2011 Suzuki ................. B62D 5/0403
318/724

FOREIGN PATENT DOCUMENTS

JP 2007-116849 A 5/2007
JP 2010-241165 A 10/2010
(Continued)

OTHER PUBLICATIONS

International Search Report of PCT/JP2015/080892 dated Jan. 19, 2016 [PCT/ISA/210].

*Primary Examiner* — Isaac G Smith
(74) *Attorney, Agent, or Firm* — Sughrue Mion PLLC; Richard C. Turner (57) ABSTRACT

Provided is an electric power steering device capable of continuing control while ensuring a satisfactory level of a steering feeling of a driver at a time of occurrence of failure of one motor winding set. A control part is configured to detect a failure of each component of the electric power steering device, and when control is continued with field-weakening control by a normal motor winding and an inverter circuit depending on the detected failure, restrict a d-axis current based on a torque ripple that occurs in a steering wheel of a vehicle with respect to the field-weakening control of a state in which the failure has not occurred.

11 Claims, 4 Drawing Sheets

(51) Int. Cl.
*H02P 25/22* (2006.01)
*H02P 29/024* (2016.01)
*H02P 21/22* (2016.01)
*H02P 29/50* (2016.01)
*H02P 21/00* (2016.01)
*H02P 21/05* (2006.01)

(56) References Cited

FOREIGN PATENT DOCUMENTS

| | | | |
|---|---|---|---|
| JP | 2010241165 A | * | 10/2010 |
| JP | 2011-078230 A | | 4/2011 |
| JP | 4831503 B2 | | 12/2011 |
| JP | 5355968 B2 | | 11/2013 |

* cited by examiner

ELECTRIC POWER STEERING DEVICE AND METHOD FOR CONTROLLING SAME

CROSS REFERENCE TO RELATED APPLICATIONS

This application is a National Stage of International Application No. PCT/JP2015/080892, filed Nov. 2, 2015.

TECHNICAL FIELD

The present invention relates to an electric power steering device configured to assist in controlling a driver's steering torque with a motor, and to a control method for the electric power steering device.

BACKGROUND ART

Hitherto, there has been known an electric power steering device including: two sets of motor windings, which are arranged in a stator of a motor; and two inverter circuits, which are capable of driving the two sets of motor windings independently of each other, and are arranged in a control unit, in which the electric power steering device is configured to control motor winding sets, which are each a set of one of the two sets of motor windings and one of the two inverter circuits, in cooperation with each other, to thereby continue drive of the motor by a normal motor winding set when the other motor winding set has failed.

There is disclosed an electric power steering device configured to increase, when a short-circuit failure has occurred in a switching element included in an inverter circuit of a control unit, output of a normal motor winding set so as to cancel a brake torque that is caused by a failed motor winding set (e.g., refer to Patent Literature 1).

CITATION LIST

Patent Literature

[PTL 1] JP 4831503 B2

SUMMARY OF INVENTION

Technical Problem

However, the related art has the following problems.

The electric power steering device disclosed in Patent Literature 1 handles the problem of how to continue control by the normal motor winding set in face of the short-circuit failure of a switching element. However, an apparatus including a large number of components may incur various kinds of failures, although the configuration of the apparatus may allow only a limited number of methods to cope with those failures. As a result, there is a problem in that it is difficult to maintain a constant level of steering feeling of the driver at the time of occurrence of a failure.

A method of continuing control in consideration of a difference in type of the failure or a difference in configuration of the apparatus, and a manner of continuing control to allow the driver to continue driving a vehicle are required to be discussed. In other words, there is a demand for development of a device capable of detecting a failure and continuing control in a balanced manner.

The present invention has been made to solve the above-mentioned problem, and has an object to provide an electric power steering device and a control method for the electric power steering device, which are capable of continuing control while maintaining a satisfactory level of steering feeling of a driver at the time of occurrence of a failure in one motor winding set.

Solution to Problem

According to one embodiment of the present invention, there is provided an electric power steering device including: a motor configured to assist in controlling a driver's steering torque of a vehicle; and a control unit including inverter circuits each including a plurality of switching elements, the control unit being configured to control drive of the motor, in which the motor includes at least two independent sets of motor windings, in which the control unit includes: a control part configured to calculate a current command value for driving the motor in a d-q-axis coordinate system; and an output part configured to drive the plurality of switching elements by a drive signal corresponding to the current command value, to thereby be capable of supplying currents to the at least two independent sets of motor windings independently of each other, and in which the control part is configured to: detect a failure of each component of the electric power steering device; and restrict, when control is continued with field-weakening control by a normal one of the at least two independent sets of motor windings and a normal one of the inverter circuits depending on the detected failure, a d-axis current based on a torque ripple that occurs in a steering wheel of the vehicle with respect to the field-weakening control of a state in which the failure has not occurred.

Further, according to one embodiment of the present invention, there is provided a control method for an electric power steering device, which is implemented by an electric power steering device, the electric power steering device including: a motor configured to assist in controlling a driver's steering torque of a vehicle; and a control unit including inverter circuits each including a plurality of switching elements, the control unit being configured to control drive of the motor, the motor including at least two independent sets of motor windings, the control unit including: a control part configured to calculate a current command value for driving the motor in a d-q-axis coordinate system; and an output part configured to drive the plurality of switching elements by a drive signal corresponding to the current command value, to thereby be capable of supplying currents to the at least two independent sets of motor windings independently of each other, the control method including the steps of: detecting a failure of each component of the electric power steering device; determining whether or not to continue control with field-weakening control by a normal one of the at least two independent sets of motor windings and a normal one of the inverter circuits depending on the detected failure; and restricting, when the control is determined to be continued, a d-axis current based on a torque ripple that occurs in a steering wheel of the vehicle with respect to the field-weakening control of a state in which the failure has not occurred.

Advantageous Effects of Invention

With the electric power steering device according to the present invention, the control part detects a failure of each component of the electric power steering device, and when control is continued with the field-weakening control by the normal motor winding and the inverter circuit depending on the detected failure, the d-axis current is restricted based on a torque ripple that occurs in the steering wheel of the vehicle with respect to the field-weakening control of the state in which the failure has not occurred.

Therefore, it is possible to continue control while maintaining a satisfactory level of steering feeling of the driver at the time of occurrence of a failure in one motor winding set.

DESCRIPTION OF EMBODIMENTS

A description is now given of an electric power steering device and a control method for the electric power steering device according to preferred embodiments of the present invention with reference to the accompanying drawings. Throughout the drawings, like or corresponding components are denoted by like reference numerals to describe those components.

First Embodiment

Figure 1:
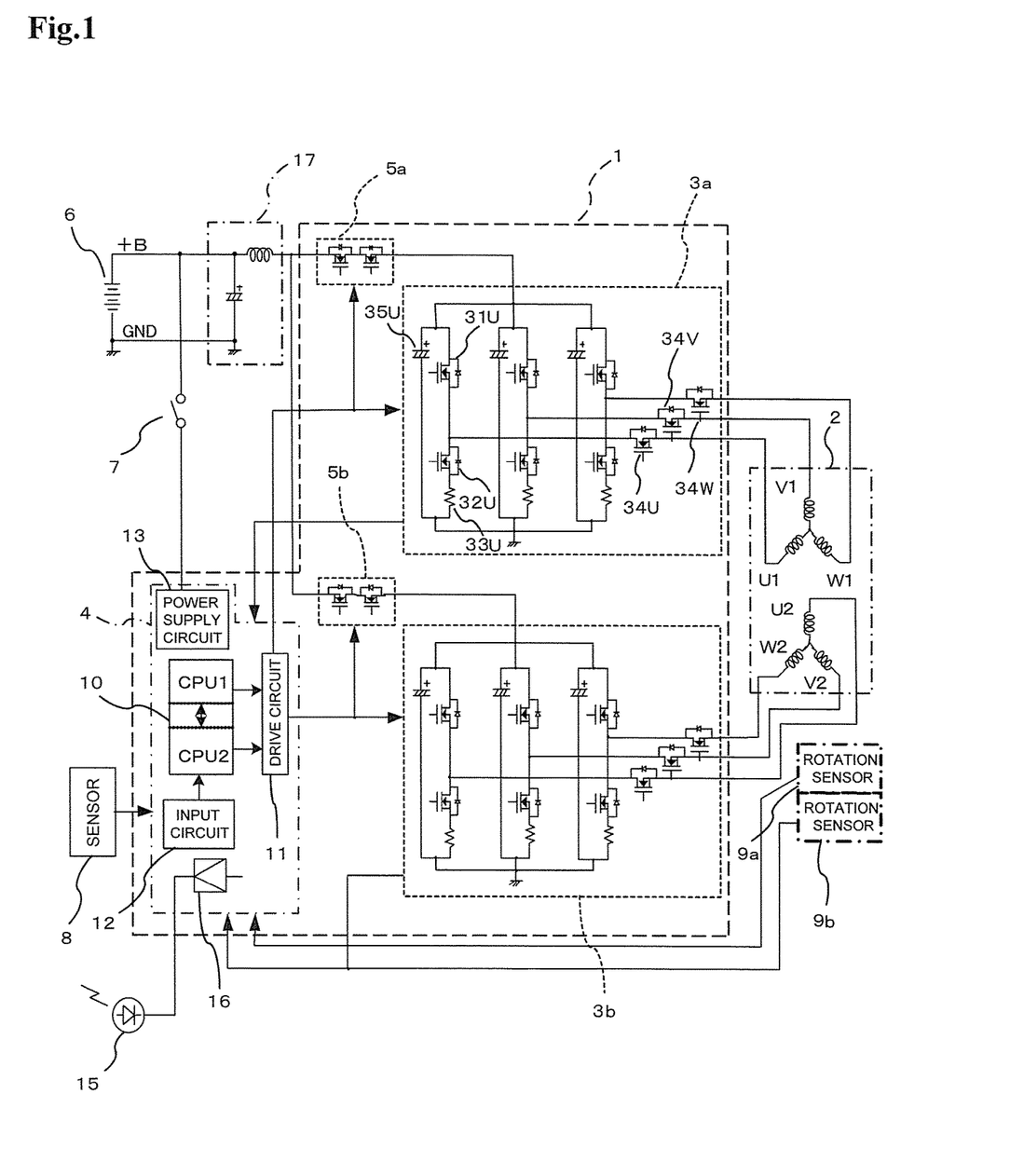
FIG. 1 is a circuit diagram for illustrating an entire configuration of an electric power steering device according to a first embodiment of the present invention.

FIG. 1 is a circuit diagram for illustrating an entire configuration of an electric power steering device according to a first embodiment of the present invention. In FIG. 1, the electric power steering device includes a control unit 1 and a motor 2 to be controlled by the control unit 1. The motor 2 includes two sets of three-phase motor windings.

The control unit 1 includes inverter circuits 3a and 3b, which are main component circuits of an output part, a control circuit part 4 having a CPU 10 playing a primary role of a control part mounted thereon, and power supply relays 5a and 5b.

Further, a battery 6 mounted on a vehicle supplies power (+B, GND) to the control unit 1, and the control circuit part 4 is powered on by an ignition switch 7 via a power supply circuit 13. A noise filter 17 is provided on a power supply path between the battery 6 and the control unit 1.

Further, sensors 8 such as a torque sensor installed near a steering wheel of the vehicle and configured to detect a steering torque and a speed sensor configured to detect a traveling speed of the vehicle detect information for input to the control circuit unit 4. The information from the sensors 8 is transmitted to the CPU 10 via the input circuit 12 of the control circuit part 4.

The CPU 10 calculates a current command value for driving the motor 2 based on the information acquired from the sensors 8 via the input circuit 12, and outputs the current command value to a drive circuit 11. The drive circuit 11 outputs a drive signal for driving each switching element of the inverter circuits 3a and 3b based on the current command value from the CPU 10.

The inverter circuits 3a and 3b each include, for each of three-phase motor windings (U, V, W) of the motor 2, switching elements 31 and 32 for upper and lower arms, a shunt resistor 33 for current detection, a switching element 34 serving as a motor relay, which establishes or cuts off connection to a motor winding, and a capacitor 35 for noise reduction.

Further, the inverter circuits 3a and 3b have the same circuit configuration for motor windings of different phases, and can supply current to the motor windings of different phases independently of one another. The shunt resistor 33 for current detection is installed downstream of the lower arm. However, the installation position is not limited thereto, and the shunt resistor 33 may be installed near the upper-arm switching element or the power line.

Further, a potential difference between both terminals of the shunt resistor 33, and a voltage between terminals of the motor winding, for example, are also transmitted to the CPU 10 via the input circuit 12. The CPU 10 calculates a difference between the calculated current command value and a detection value corresponding to the current command value and performs so-called feedback control, to thereby supply a desired motor current and assist in controlling a steering force.

Further, the drive circuit 11 outputs a drive signal to the switching elements 5a and 5b serving as power supply relays, and can cut off supply of current to the motor 2 by the switching elements 5a and 5b serving as power supply relays. Similarly, the drive circuit 11 outputs a drive signal to the switching elements 34 serving as motor relays, and can cut off supply of current to the motor windings of different phases of the motor 2 independently of one another.

The CPU 10 has a failure detection function of detecting failures in the inverter circuits 3a and 3b, the motor windings, and other circuits based on each input information. When the CPU 10 detects a failure, the CPU 10 sets the switching element 34 serving as a motor relay off via the drive circuit 11 so that, for example, only supply of current to a motor winding of a predetermined phase is cut off depending on the failure.

The CPU 10 can also set the switching elements 5a and 5b serving as power supply relays off via the drive circuit 11 to cut off power completely. Further, when the CPU 10 detects a failure, the CPU 10 outputs an operation command via an output circuit 16 so that, for example, a lamp forming the notification unit 15 is turned on. The switching elements 5a and 5b serving as power supply relays may be included in the inverter circuits 3a and 3b, respectively.

The motor 2 is a brushless motor in which two sets of three-phase motor windings are star-connected. Rotation sensors 9a and 9b for detecting a rotation position of a rotor are installed in the motor 2. The two sensors are provided to ensure the redundancy of the rotation sensor, and the rotation information obtained by each sensor is transmitted to the CPU 10 via the input circuit 12.

It is conceivable that the rotation sensors 9a and 9b are configured such that, for example, a magnetic rotor is installed at an end of a rotational shaft of the motor 2 and a rotation sensor IC is installed at the opposite position. In this manner, it is indispensable that the rotation sensors 9a and 9b be mounted near the motor 2 to achieve reduction in size of the entire device. However, the influence of noises due to on/off drive of a large amount of current is also required to be considered.

The motor 2 is not required to be the three-phase brushless motor of the star connection, and may have delta connection, or may be two bipolar pairs of brushed motors. A winding specification of the motor may be such that a phase difference is provided between the respective sets, or may be so-called multi-phase (six-phase) motor windings without a phase difference.

As described above, the control unit 1 is configured to drive the motor 2 using the information, calculated value, and detected value, which are input independently of one another. Further, although the CPU 10 and the drive circuit 11 are each illustrated as a single component, the control unit 1 may include two CPUs (CPU 1 and CPU 2) and two drive circuits corresponding to the inverter circuits 3a and 3b, respectively. Further, the control unit 1 may include one independent power supply circuit 13 for each of the CPU 10 and the drive circuit 11.

Next, a description is given of detection of a failure in the CPU 10 by the electric power steering device configured as described above. The CPU 10 can detect an open-circuit failure and a short-circuit failure of the switching element by controlling on/off of each switching element and comparing voltage values on the circuit with each other as an initial check at the time of activation.

Further, the CPU 10 can also check the shunt resistor 33 by supplying an amount of current small enough not to rotate the motor 2. Further, under control by the CPU 10, two motor winding sets, which are each a set of one of two sets of motor windings of the motor 2 and one of the inverter circuits 3a and 3b, are controlled equally, to thereby be capable of detecting a failure by comparing, for example, voltages, currents, and rotational positions of units of those two motor winding sets with each other.

When the CPU 10 detects a failure in one motor winding set, for example, an open-circuit failure or a short-circuit failure of a plurality of switching elements of the inverter circuit 3b, or disconnection of the motor winding, the CPU 10 may determine that control can no longer be continued with this failed motor winding set.

At this time, the CPU 10 can continue control with only the remaining normal motor winding set, and thus the CPU 10 continues control by switching to control with only the remaining normal motor winding set. That is, even in a case where control is performed with only one motor winding set, control can be continued without any problem as long as a desired output torque, namely, a sufficient steering force, can be acquired.

However, a situation in which a load is large and the number of revolutions of the motor is required to be increased sometimes occurs during operation. Usually, under a large number of revolutions of the motor, when a power supply voltage is fixed, an induced voltage caused by the motor 2 prevents the increase in the g-axis current. A relationship among a d-axis current Id, a q-axis current Iq, and a rated current Idqmax is represented by Expression (1), and a relationship among a d-axis voltage Vd, a q-axis voltage Vq, and a battery voltage Vdc is represented by Expression (2).

$$Id^2 + Iq^2 \leq Idq\text{max}^2 \quad (1)$$

$$Vd^2 + Vq^2 \leq Vdc^2/2 \quad (2)$$

Further, the d-axis voltage Vd and the q-axis voltage Vq are normally represented by Expressions (3) and (4), respectively.

$$Vd = RId - \omega LIq \quad (3)$$

$$Vq = RIq + \omega(LId + \varphi) \quad (4)$$

In Expressions (3) and (4), R represents a winding resistance, L represents a self-inductance, ω represents an electrical angular velocity, and φ represents a magnetic flux.

When the number of revolutions of the motor becomes larger, the value of ω in Expressions (3) and (4) increases, and as a result, absolute values of the d-axis voltage Vd and the q-axis voltage Vq increase. Meanwhile, the voltage is required to satisfy Expression (2), which results in decrease of Iq. Therefore, so-called field-weakening control, which is control of decreasing LId+φ by increasing the negative d-axis current, is often performed to increase the number of revolutions of the motor.

In Expressions (3) and (4), when Id is caused to be in a reverse direction, namely, in a negative direction, the q-axis value increases by that amount. As a result, the number of revolutions of the motor increases, whereas the output torque decreases. Thus, the field-weakening control is used to cover control in a large number of revolutions.

However, in this field-weakening control region, a torque ripple due to error components contained in the detected angle information is liable to occur. When a torque ripple occurs, the driver may feel uneasy or dissatisfied due to transmission of vibration through the steering wheel.

Figure 2:
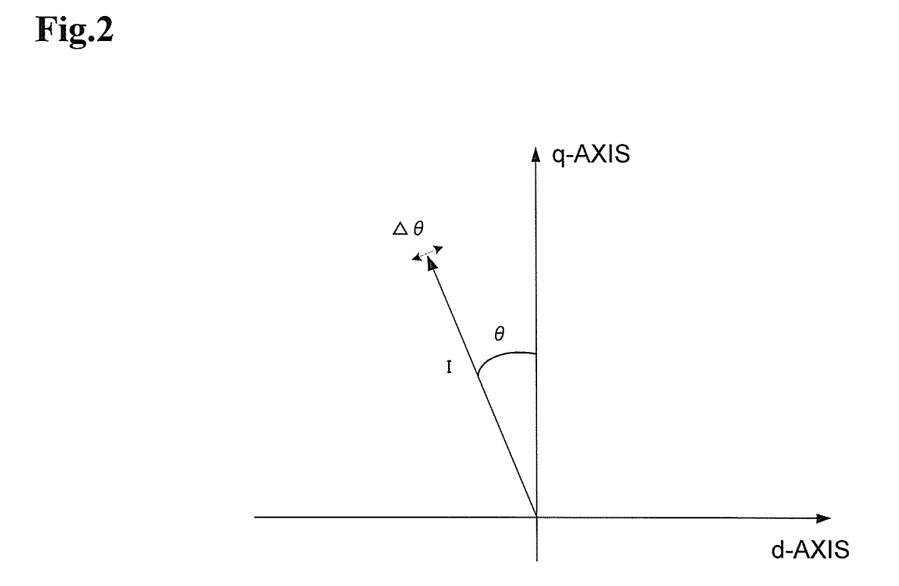
FIG. 2 is a graph for showing a d-axis current in the electric power steering device according to the first embodiment of the present invention.

Now, a description is given of this issue with reference to FIG. 2. FIG. 2 is a graph for showing the d-axis current in the electric power steering device according to the first embodiment of the present invention. In FIG. 2, d-q axis coordinates represent how a negative current flows starting from substantially the zero current on the d-axis. In FIG. 2, a current I flows with a deviation of e from the q-axis. The angle θ of deviation inherent in the current I contains an error Δθ, and thus this error is a torque ripple represented by Expression (5).

$$Kt I \Delta\theta \sin \theta \approx Kt |Id| \Delta\theta \quad (5)$$

In Expression (5), Kt represents a torque constant.

In Expression (5), as the phase angle θ becomes larger, the d-axis current becomes larger. Further, even when the angle error Δθ is the same, as the d-axis current becomes larger, a proportion of the q-axis component to the current ripple becomes larger, resulting in a larger torque ripple. Further, at the time of on/off control of the current, the rotation sensors 9a and 9b may incur an influence of a magnetic field formed by, for example, the motor windings, the motor winding inverter circuits 3a and 3b, or a connection portion therebetween, to result in a rotation error.

In this case, when the motor winding sets, which are each a set of one of two sets of motor windings of the motor 2 and one of the inverter circuits 3a and 3b, successively cancel influences of their own magnetic fields by themselves, the error is maintained to be small. However, when only one motor winding set is used for control, the error inherent in the phase angle θ tends to increase compared to normal control of two motor winding sets.

Figure 3:
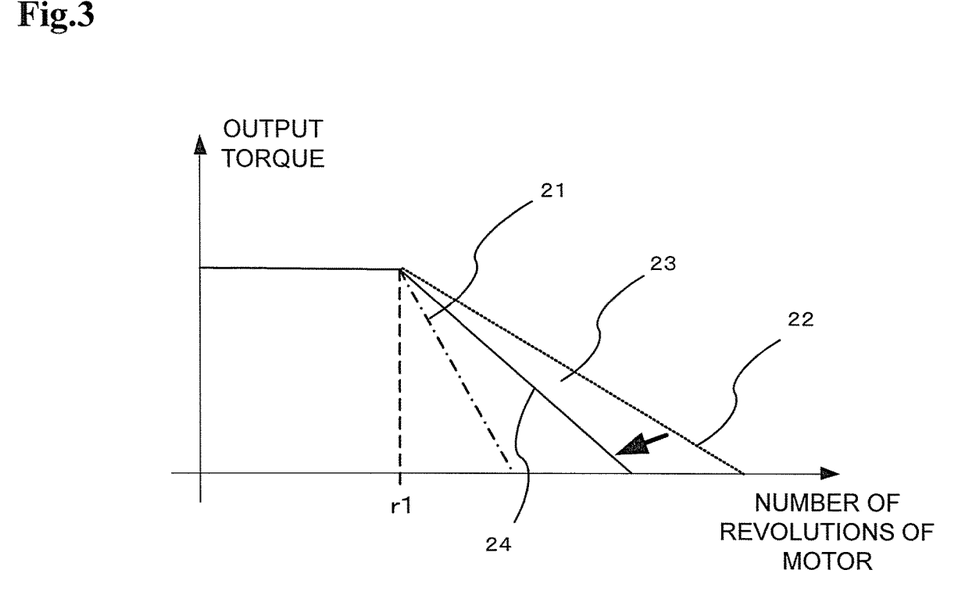
FIG. 3 is a graph for showing restriction on the d-axis current in the electric power steering device according to the first embodiment of the present invention.

In view of the above, when only one motor winding set is used to continue control, the torque ripple in this field-weakening control region is required to be suppressed. In the following, a description is given of the method with reference to FIG. 3, which is a graph for showing restriction on the d-axis current in the electric power steering device according to the first embodiment of the present invention. In FIG. 3, the horizontal axis represents the number of revolutions of the motor, and the vertical axis represents the output torque.

In FIG. 3, a characteristic 21 represents an output torque in a case where the d-axis current is zero without the field-weakening control, and a characteristic 22 represents an output torque in a normal situation, namely, a case where both the two motor winding sets do not fail and are in normal operation. Further, r1 represents a rated number of revolutions of the motor 2, which is a value obtained by Expressions (1) and (2) given above. Further, in FIG. 3, a region 23 sandwiched between the characteristic 21 and the characteristic 22 is a field-weakening control region, in which the torque ripple increases.

When only one motor winding set is used to continue control, it is required to put a restriction on the d-axis current in consideration of the torque ripple. An example of this phenomenon is shown by a d-axis current restriction characteristic 24 of FIG. 3. At this time, the field-weakening control is performed with a predetermined d-axis current value, and thus a characteristic of dividing the region 23 is shown in FIG. 3. In particular, the left part of the region 23 is a region in which the torque ripple is not so large even when the field-weakening control is performed and the driver does not feel much vibration. In contrast, the right part of the region 23 is a region in which the torque ripple is large.

The magnitude of the torque ripple cannot be measured without an additional sensor, but it is effective to use an alternative value of the torque ripple or a value corresponding to the torque ripple for determination of the d-axis current value in terms of cost.

Further, the d-axis current value acquired in advance empirically in a specific vehicle can also be used. Determination of the level of a torque ripple at which an average driver feels uneasy or dissatisfied enables determination of a corresponding angle error $\Delta\theta$ of FIG. 2. After that, the angle error $\Delta\theta$ can be used to determine the d-axis current value with Expression (6).

$$Idlmt \propto K/Kt\Delta\theta \qquad (6)$$

In Expression (6), Idlmt represents the restricted value of Id, and K represents a constant.

As a result, an intermediate region between a case in which the d-axis current is zero without the field-weakening control and a case in which the two motor winding sets are both normal, which suppresses the increase in the torque ripple and handles a large number of revolutions. Therefore, it is possible to continue control in a large-load region while suppressing vibration of the steering wheel as much as possible even when one motor winding set has failed, to thereby ensure operability.

Further, the characteristic can be set freely in advance in consideration of the relationship with the torque ripple, and can be changed depending on the vehicle or the vehicle speed. Further, the driver can be notified of the fact that the d-axis current restriction function is effective by a method different from a notification method that is used at the time of detection of a failure, for example, by changing a lighting mode of the notification unit 15 of FIG. 1.

That is, when one motor winding set has failed and only the other motor winding set is used to continue control, the d-axis current is reduced in consideration of the control performance and the steering feeling. Therefore, it is possible to suppress a torque ripple during steering.

As described above, according to the first embodiment, the control part detects a failure of each component of the electric power steering device, and when control is continued with the field-weakening control by the normal motor winding and the inverter circuit depending on the detected failure, the d-axis current is restricted based on a torque ripple that occurs in the steering wheel of the vehicle with respect to the field-weakening control of a state in which the failure has not occurred.

Therefore, it is possible to continue control while maintaining a satisfactory level of steering feeling of the driver at the time of occurrence of a failure in one motor winding set.

Second Embodiment

In a second embodiment of the present invention, a description is given of another method of suppressing the torque ripple in the field-weakening control region when only one motor winding set is used to continue control.

Figure 4:
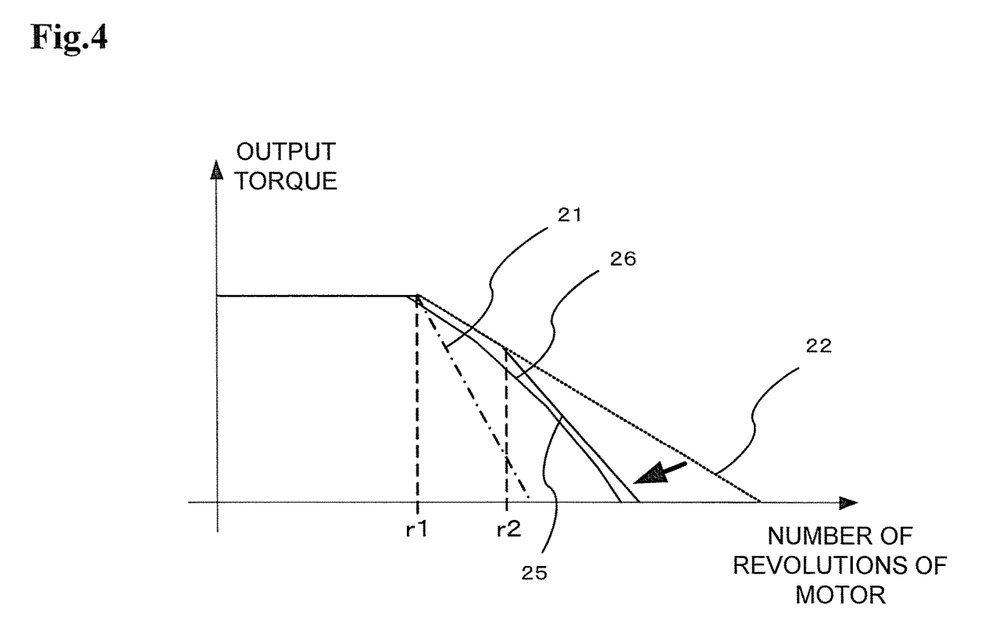
FIG. 4 is a graph for showing restriction on the d-axis current in an electric power steering device according to a second embodiment of the present invention.

In the following, a description is given of this method with reference to FIG. 4 for showing restriction on the d-axis current in an electric power steering device according to the second embodiment of the present invention. In FIG. 4, the horizontal axis represents the number of revolutions of the motor, and the vertical axis represents the output torque. Further, the same parts as those of FIG. 3 are denoted by the same reference symbols.

In FIG. 4, a d-axis current restriction characteristic 25 exhibits, until a number r2 of revolutions of the motor is reached, the same characteristic as that in a normal time, namely, a case where the two motor winding sets do not fail and are normal. The d-axis current restriction characteristic 25 exhibits a steep drop in output torque after the number r2 of revolutions of the motor.

In the d-axis current restriction characteristic 25, the normal field-weakening control is performed without restriction on the d-axis current until the number r2 of revolutions of the motor. In this region, the increase in the torque ripple is small, and the driver does not feel much vibration of the steering wheel. The number r2 of revolutions of the motor is the boundary, and the d-axis current is restricted after the number of revolutions of the motor exceeds r2.

In this case, the d-axis current may further be reduced to attenuate the characteristic without holding the d-axis current value. With this, two or more types of d-axis current values can be used for control. In other words, the restriction on the d-axis current is not further increased but is reduced after the number of revolutions of the motor exceeds r2.

The following three methods may be used to determine the number r2 of revolutions of the motor without incorporating additional sensors or the like. The first method is to focus attention on the fact that the increase in the d-axis current and the increase in the torque ripple are proportional to each other, and determine the number of r2 revolutions of the motor of a time when the d-axis current reaches a predetermined value. The second method is to use the phase angle $\theta$, and determine the number r2 of revolutions of the motor of a time when the phase angle $\theta$ reaches a predetermined angle. The third method is to determine the number r2 of revolutions of the motor of a time when the number of revolutions of the motor reaches a predetermined number of revolutions.

With any of the methods described above, the threshold value of the torque ripple is empirically found depending on the vehicle on which the electric power steering device is mounted, and is stored into the CPU 10 or the like in advance, to thereby be able to use the d-axis current, the phase angle, or the number of revolutions of the motor in place of the torque ripple value.

That is, depending on the d-axis current, the phase angle $\theta$, or the number of revolutions of the motor, the d-axis current is controlled in the usual manner in a region in which the value is smaller than a predetermined value, and when the number of revolutions of the motor is equal to or more than the number r2 of revolutions of the motor of FIG. 4, the d-axis current is restricted to further decrease.

In this manner, the restriction on the d-axis current is controlled as in the usual manner at the initial time, and when the d-axis current reaches a predetermined position, the d-axis current is further decreased after that position, to thereby be able to easily increase the number of revolutions of the motor while suppressing the torque ripple without incorporating an additional sensor.

Further, the d-axis current limitation characteristic of FIG. 4 has two characteristics, namely, the normal field-weakening control and restriction on the d-axis current. However, the d-axis current limitation characteristic 25 may have three or more characteristics depending on the torque ripple. Further, as shown in the d-axis current restriction characteristic 26 of FIG. 4, for example, the d-axis current may continue to be reduced depending on time or the number of revolution of the motor, or the number r1 of revolutions of the motor for starting the field-weakening control may be set variable as well.

In the first and second embodiments, a description has been given of a case in which, regarding the electric power steering device including the two sets of motor windings and the two inverter circuits, when one motor winding set has failed, the remaining motor winding set is used to continue control. However, the d-axis current can similarly be restricted also when a part of one motor winding set and a part of the other motor winding set have failed and only the normal parts of those motor winding sets are used to continue control.

Specifically, for example, when each inverter circuit of the two motor winding sets has a failure of only one phase and the motor winding sets each execute two-phase drive, the torque ripple can be reduced by restricting the d-axis current. Further, also when the electric power steering device has only one motor winding set, the present invention can be applied by restricting the d-axis current similarly at the time of two-phase drive.

The invention claimed is:

1. An electric power steering device, comprising:
a motor configured to assist in controlling a driver's steering torque of a vehicle; and
a control unit including inverter circuits each including a plurality of switching elements, the control unit being configured to control drive of the motor,
wherein the motor includes at least two independent sets of motor windings,
wherein the control unit includes:
a control part configured to calculate a current command value for driving the motor in a d-q-axis coordinate system; and
an output part configured to drive the plurality of switching elements by a drive signal corresponding to the current command value, to thereby be capable of supplying currents to the at least two independent sets of motor windings independently of each other, and
wherein the control part is configured to:
detect a failure of each component of the electric power steering device; and
restrict, when control is continued with field-weakening control by a normal one of the at least two independent sets of motor windings and a normal one of the inverter circuits depending on the detected failure, a d-axis current based on a torque ripple that occurs in a steering wheel of the vehicle with respect to the field-weakening control of a state in which the failure has not occurred.

2. An electric power steering device according to claim 1, wherein the control part is configured to continue control using a d-axis current value that is determined in advance in association with a predetermined torque ripple when a number of revolutions of the motor reaches a rated number of revolutions.

3. An electric power steering device according to claim 1, wherein the control part is configured to continue control by switching between a plurality of d-axis current values that are determined in advance in association with predetermined torque ripples.

4. An electric power steering device according to claim 3, wherein the control part is configured to restrict the d-axis current when a d-axis current value or a d-axis phase angle corresponding to the torque ripple is reached after the control part first continues control with the d-axis current of the state in which the failure has not occurred.

5. An electric power steering device according to claim 3, wherein the control part is configured to restrict the d-axis current when a number of revolutions of the motor corresponding to the torque ripple is reached after the control part first continues control with the d-axis current of the state in which the failure has not occurred.

6. An electric power steering device according to claim 1, further comprising a notification unit configured to notify a fact that the control part has started to restrict the d-axis current with a method different from a notification method that is used at a time of detection of a failure.

7. An electric power steering device according to claim 2, further comprising a notification unit configured to notify a fact that the control part has started to restrict the d-axis current with a method different from a notification method that is used at a time of detection of a failure.

8. An electric power steering device according to claim 3, further comprising a notification unit configured to notify a fact that the control part has started to restrict the d-axis current with a method different from a notification method that is used at a time of detection of a failure.

9. An electric power steering device according to claim 4, further comprising a notification unit configured to notify a fact that the control part has started to restrict the d-axis current with a method different from a notification method that is used at a time of detection of a failure.

10. An electric power steering device according to claim 5, further comprising a notification unit configured to notify a fact that the control part has started to restrict the d-axis current with a method different from a notification method that is used at a time of detection of a failure.

11. A control method for an electric power steering device, which is implemented by an electric power steering device,
the electric power steering device including:
a motor configured to assist in controlling a driver's steering torque of a vehicle; and
a control unit including inverter circuits each including a plurality of switching elements, the control unit being configured to control drive of the motor,
the motor including at least two independent sets of motor windings,
the control unit including:
a control part configured to calculate a current command value for driving the motor in a d-q-axis coordinate system; and an output part configured to drive the plurality of switching elements by a drive signal corresponding to the current command value, to thereby be capable of supplying currents to the at least two independent sets of motor windings independently of each other, the control method comprising the steps of:
detecting a failure of each component of the electric power steering device;
determining whether or not to continue control with field-weakening control by a normal one of the at least two independent sets of motor windings and a normal one of the inverter circuits depending on the detected failure; and
restricting, when the control is determined to be continued, a d-axis current based on a torque ripple that occurs in a steering wheel of the vehicle with respect to the field-weakening control of a state in which the failure has not occurred.

* * * * *